US012580450B2

(12) United States Patent
Okuyama et al.

(10) Patent No.: US 12,580,450 B2
(45) Date of Patent: Mar. 17, 2026

(54) ROTARY ELECTRICAL MACHINE

(71) Applicant: NISSAN MOTOR CO., LTD.,
Yokohama (JP)

(72) Inventors: Takenari Okuyama, Kanagawa (JP);
Tomoki Takeuchi, Kanagawa (JP)

(73) Assignee: NISSAN MOTOR CO., LTD.,
Yokohama (JP)

( * ) Notice: Subject to any disclaimer, the term of this
patent is extended or adjusted under 35
U.S.C. 154(b) by 203 days.

(21) Appl. No.: 18/566,026

(22) PCT Filed: Jun. 2, 2021

(86) PCT No.: PCT/JP2021/021076
§ 371 (c)(1),
(2) Date: Nov. 30, 2023

(87) PCT Pub. No.: WO2022/254631
PCT Pub. Date: Dec. 8, 2022

(65) Prior Publication Data
US 2024/0258880 A1 Aug. 1, 2024

(51) Int. Cl.
*H02K 9/08* (2006.01)
*H02K 5/20* (2006.01)
*H02K 9/06* (2006.01)

(52) U.S. Cl.
CPC .................. *H02K 9/08* (2013.01); *H02K 5/20*
(2013.01); *H02K 9/06* (2013.01); *H02K*
*2209/00* (2013.01)

(58) Field of Classification Search
CPC ........ H02K 1/32; H02K 2209/00; H02K 3/12;
H02K 3/24; H02K 5/20; H02K 9/06;
H02K 9/08; H02K 9/10; H02K 9/12;
Y02T 10/64
See application file for complete search history.

(56) References Cited

U.S. PATENT DOCUMENTS

| | | | | | |
|---|---|---|---|---|---|
| 5,955,804 | A | * | 9/1999 | Kusase | .................... H02K 3/12 |
| | | | | | 310/58 |
| 6,541,890 | B2 | * | 4/2003 | Murata | .................. H02K 1/243 |
| | | | | | 310/263 |
| 2009/0217693 | A1 | | 9/2009 | Kikuchi et al. | |

FOREIGN PATENT DOCUMENTS

| | | | |
|---|---|---|---|
| JP | 2006-046699 | A1 | 2/2006 |
| JP | 2008-043149 | A1 | 2/2008 |
| JP | 6708526 | B2 | 6/2020 |
| WO | WO-98/40956 | A1 | 9/1998 |

* cited by examiner

*Primary Examiner* — Naishadh N Desai
(74) *Attorney, Agent, or Firm* — Foley & Lardner LLP

(57) ABSTRACT

A rotary electrical machine in which a rotor and a stator are housed in a housing and a coil of the stator is cooled using gas. The stator includes an annular coil end protruding from an end portion of the stator in an axial direction thereof. The housing includes an introduction port configured to allow gas for cooling the rotary electrical machine to be introduced from an outside of the housing toward the coil end. The coil end includes a flow path configured to allow the gas introduced from the introduction port to pass from an outer peripheral side to an inner peripheral side. A cooling air control member configured to guide the gas introduced from the introduction port to the flow path of the coil end is provided between the coil end and the housing in the axial direction.

6 Claims, 5 Drawing Sheets

ROTARY ELECTRICAL MACHINE

TECHNICAL FIELD

The present invention relates to a rotary electrical machine.

BACKGROUND ART

Since a coil end of a rotary electrical machine generates heat when a current flows, appropriate cooling is required. JP2006-046699A discloses that in a configuration in which cooling air is sent from a fan provided outside a motor to a coil end, a guide plate is disposed such that the cooling air efficiently hits a coil end portion of a stator.

SUMMARY OF INVENTION

Problem to be Solved by the Invention

In the above patent document, since the guide plate is provided near an introduction port of the cooling air, a part of the coil end, particularly an inner peripheral side of the coil end near an air gap, is not sufficiently hit by the cooling air. Therefore, there is a problem that the coil end cannot necessarily be cooled appropriately.

The present invention has been made in view of such a problem, and an object of the present invention is to provide a technique for appropriately cooling a coil end.

Means for Solving the Problem

One aspect of the invention is applied to a rotary electrical machine in which a rotor and a stator are housed in a housing and a coil of the stator is cooled using gas. The stator includes an annular coil end protruding from an end portion of the stator in an axial direction thereof. The housing includes an introduction port configured to allow gas for cooling the rotary electrical machine to be introduced from an outside of the housing toward the coil end. The coil end includes a flow path configured to allow the gas introduced from the introduction port to pass from an outer peripheral side to an inner peripheral side. A cooling air control member configured to guide the gas introduced from the introduction port to the flow path of the coil end is provided between the coil end and the housing in the axial direction.

Effect of the Invention

According to the present invention, since a cooling air control member is provided between a coil end and a housing in an axial direction, gas introduced from an introduction port can be controlled to pass through a flow path of the coil end from the outside to the inside, and the coil end can be appropriately cooled.

DESCRIPTION OF EMBODIMENTS

Hereinafter, an embodiment of the invention will be described with reference to the drawings or the like.

Figure 1:
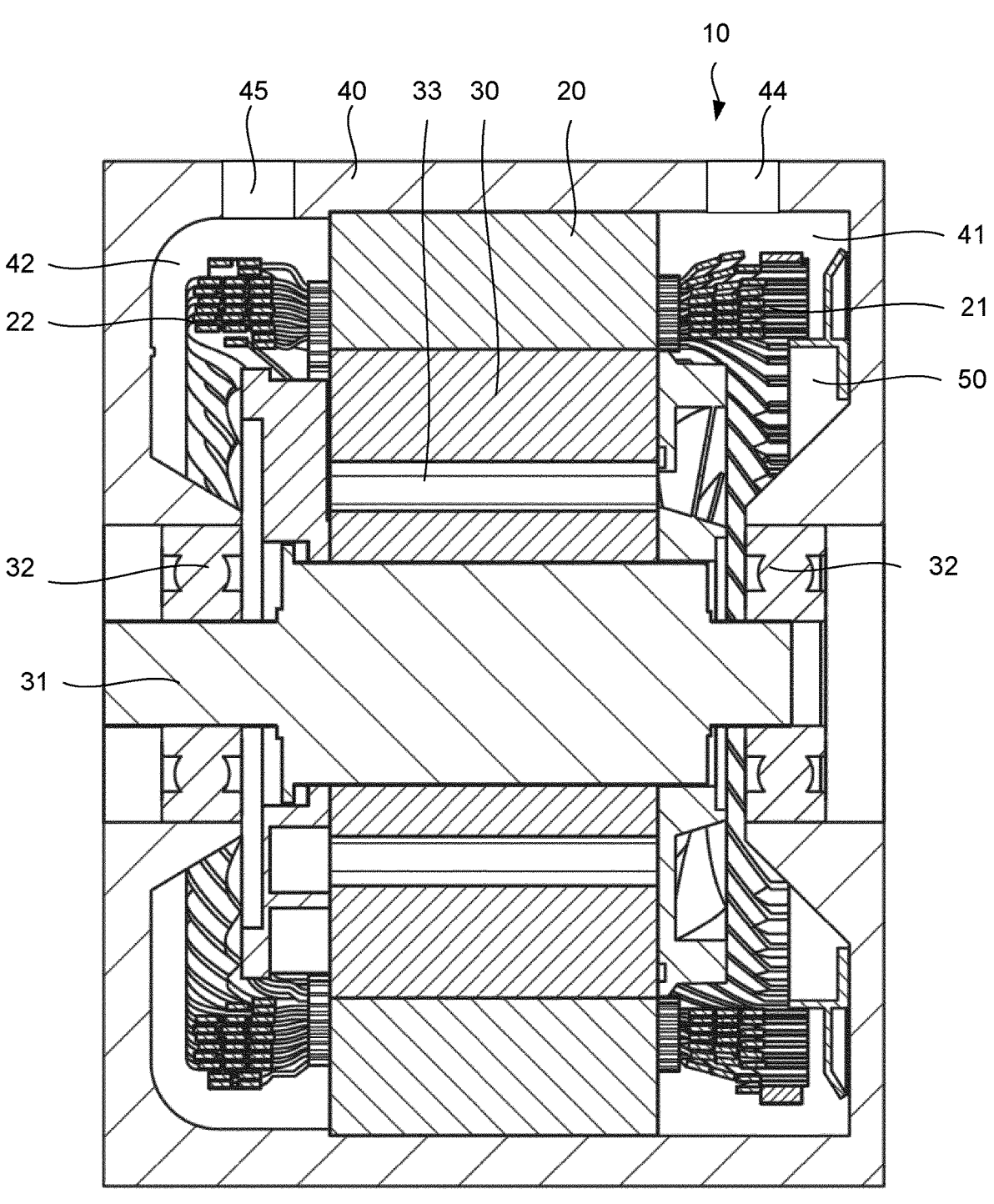
FIG. 1 is a cross-sectional view of a motor according to an embodiment of the present invention.

FIG. 1 is an explanatory view of a motor 10 as a rotary electrical machine according to an embodiment of the present invention and shows an axial cross-sectional view.

The motor 10 includes a stator 20 formed in an annular shape, a rotor 30 rotatably mounted inside the stator 20, a rotating shaft 31 fitted to the rotor 30, and a housing 40 that houses the stator 20 and the rotor 30.

A winding formed of a flat wire is inserted into a slot formed in the stator 20, and a first coil end 21 and a second coil end 22 are formed at both end portions of the stator 20 in an axial direction thereof. The first coil end 21 axially protrudes from one end portion of the stator 20. The second coil end 22 axially protrudes from the other end portion of the stator 20. When a current flows through the winding of the stator 20, the rotor 30 rotates due to the interaction with a permanent magnet provided in the rotor 30.

The winding is formed of a plurality of flat wires having a folded shape extending from one end portion of the stator 20 to the other end portion of the stator 20 and returning to the one end portion.

In the first coil end 21, the flat wires are erected in the axial direction from the other end portion of the stator 20 and are bent in a circumferential direction thereof. The portion constitutes a crossing portion 213 in which the plurality of flat wires crosses each other. The flat wires axially protrude from the crossing portion 213 toward the end portion. In the end portion, the flat wires are joined to each other, and a joint portion 214 is formed to stand toward an axial end portion. That is, the first coil end 21 is a connection side of the coil in the stator 20.

At a base portion of the first coil end 21 near the stator 20, a gap between the erected flat wires is configured as a first flow path 211 through which cooling air passes from an outer peripheral side to an inner peripheral side of the first coil end 21.

Figure 4:
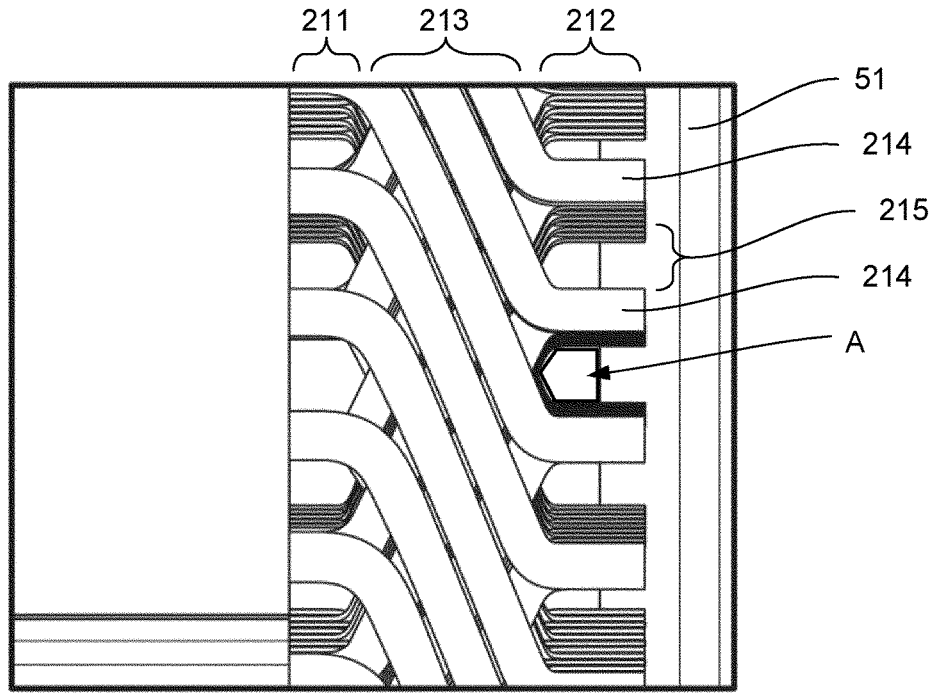
FIG. 4 is an explanatory view of the first coil end.

In the joint portion 214, which is a distal end portion of the first coil end 21 near the axial end portion, a substantially U-shaped open portion 215 is formed by the gap between the erected flat wires (see FIG. 4). The open portion 215 is configured as a second flow path 212 through which the cooling air passes from the outer peripheral side to the inner peripheral side of the first coil end 21.

In the second coil end 22, the flat wires are erected in the axial direction from the other end portion of the stator 20, then bent in the circumferential direction, and axially folded back from the bent portion toward the stator 20.

The rotor 30 includes a vent hole 33 axially penetrating from the one end portion to the other end portion. A plurality of vent holes 33 are provided at predetermined intervals in the circumferential direction. As described later, the vent hole 33 is a passage through which the cooling air passes from a first housing chamber 41 to a second housing chamber 42. The rotor 30 is cooled by the cooling air passing through the vent holes 33.

The housing 40 houses the stator 20, the rotor 30, and the rotating shaft 31. The rotating shaft 31 is rotatably supported by the housing 40 via a bearing 32.

The housing 40 supports the stator 20 on an inner periphery thereof, and is provided with the first housing chamber 41 at the one end portion of the stator 20 and the second housing chamber 42 at the other end portion of the stator 20. The first coil end 21 protruding from the one end portion of the stator 20 is housed in the first housing chamber 41. The second coil end 22 protruding from the other end portion of the stator 20 is housed in the second housing chamber 42.

An appropriate distance for insulation is secured between an inner wall of the first housing chamber 41 and the first coil end 21 and between an inner wall of the second housing chamber 42 and the second coil end 22.

The first housing chamber 41 is provided with an introduction port 44 that allows air to be introduced from an outside of the housing 40. The second housing chamber is provided with a discharge port 45 that discharges air to the outside of the housing 40.

A fan 36 is provided at one end portion of the rotor 30 (on the right side in FIG. 1). The fan 36 includes a plurality of propeller blades, and rotates along with the rotation of the rotor 30 to take in gas in the first housing chamber 41 and send the gas to the second housing chamber via the vent hole 33 of the rotor 30. Accordingly, the fan 36 generates a flow of cooling air from the introduction port 44 toward the second housing chamber 42 via the first housing chamber 41 inside the housing 40.

With such a configuration, when the fan 36 is rotated by the driving of the motor 10, the outside air introduced from the introduction port 44 is introduced as cooling air into the first housing chamber 41 to cool the first coil end 21. The cooling air is sent to the second housing chamber 42 through the vent hole 33 of the rotor 30 by the rotation of the fan 36. In the second housing chamber 42, the cooling air cools the second coil end 22. Thereafter, the cooling air is discharged from the discharge port 45. In this way, the motor 10 is cooled by the gas.

As the gas used for the cooling air of the present embodiment, the air introduced from the atmosphere is used, but the present invention is not limited thereto, and another gas (for example, carbon dioxide or sulfur hexafluoride) may be used. The cooling air introduced into the motor 10 may be cooled by a heat exchanger outside the motor 10.

Next, cooling of the first coil end 21 in the first housing chamber 41 will be described.

Since the first coil ends 21 and the second coil ends 22 generate heat when a current flows, appropriate cooling is required. The motor 10 of the present embodiment includes the fan 36 at the one end portion of the rotor 30, and is configured such that the first coil end 21 and the second coil end 22 are cooled by the cooling air generated by the fan 36.

The fan 36 includes a plurality of blades spirally extending with respect to the rotating shaft 31, takes in gas into the first housing chamber 41 from the introduction port 44 as the rotor 30 rotates, and sends the cooling air to the second housing chamber 42 via the vent hole 33.

In the first housing chamber 41, the first coil end 21 is disposed away from the inner wall of the housing 40 in order to secure an insulation distance. Therefore, the cooling air introduced from the introduction port 44 is less likely to flow into a void (first flow path 211 and second flow path 212) of the first coil end 21 that resists the flow of the cooling air, passes through a space between the end portion of the first coil end 21 and the inner wall of the first housing chamber 41, and flows to the fan 36. Therefore, the first coil end 21 may not be sufficiently cooled.

Therefore, as described below, the motor 10 of the present embodiment includes a cooling air control member 50 for appropriately cooling the first coil end 21 by controlling the flow of the cooling air at the first coil end 21.

Figure 2:
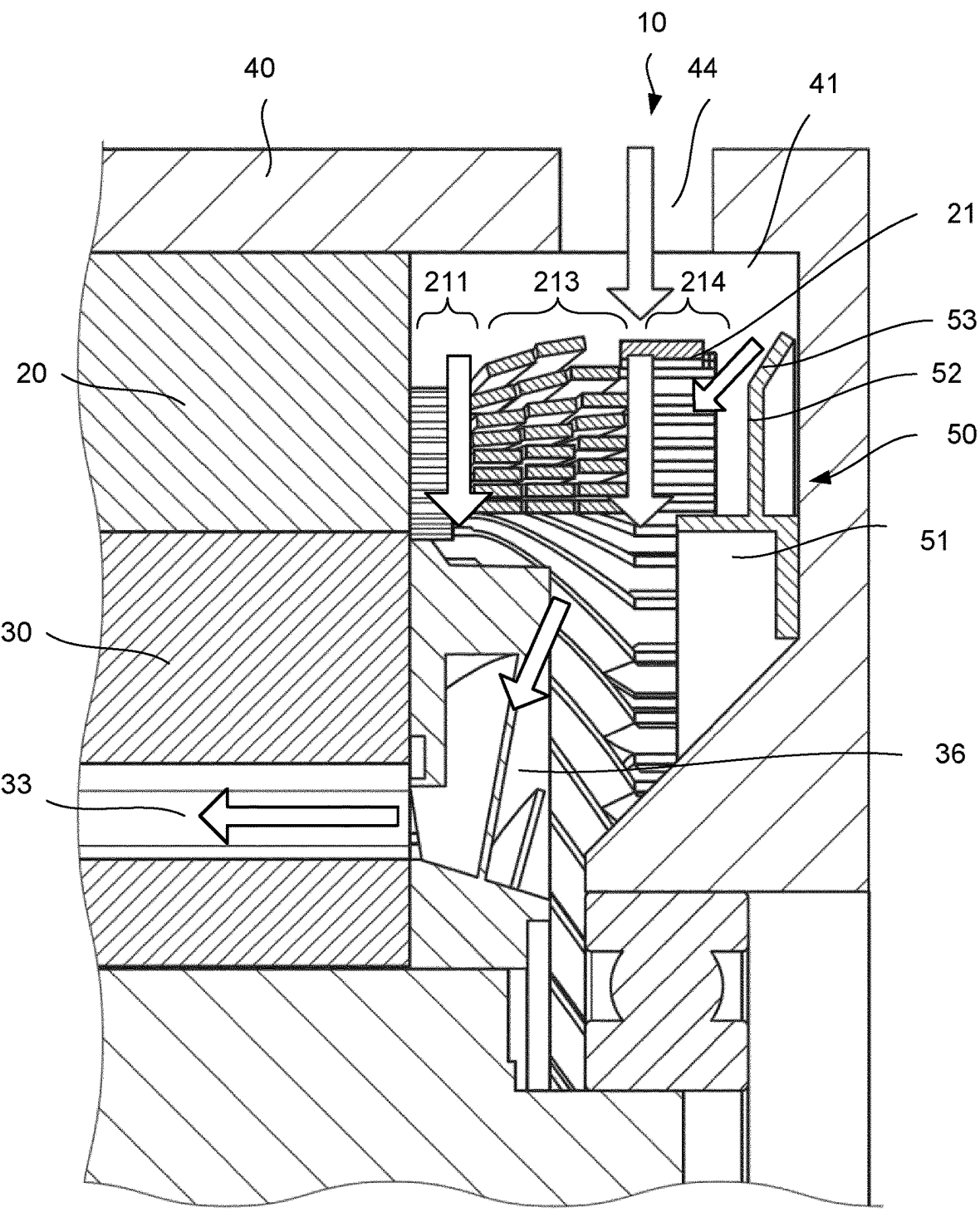
FIG. 2 is an explanatory view of a vicinity of a first coil end.
Figure 3:
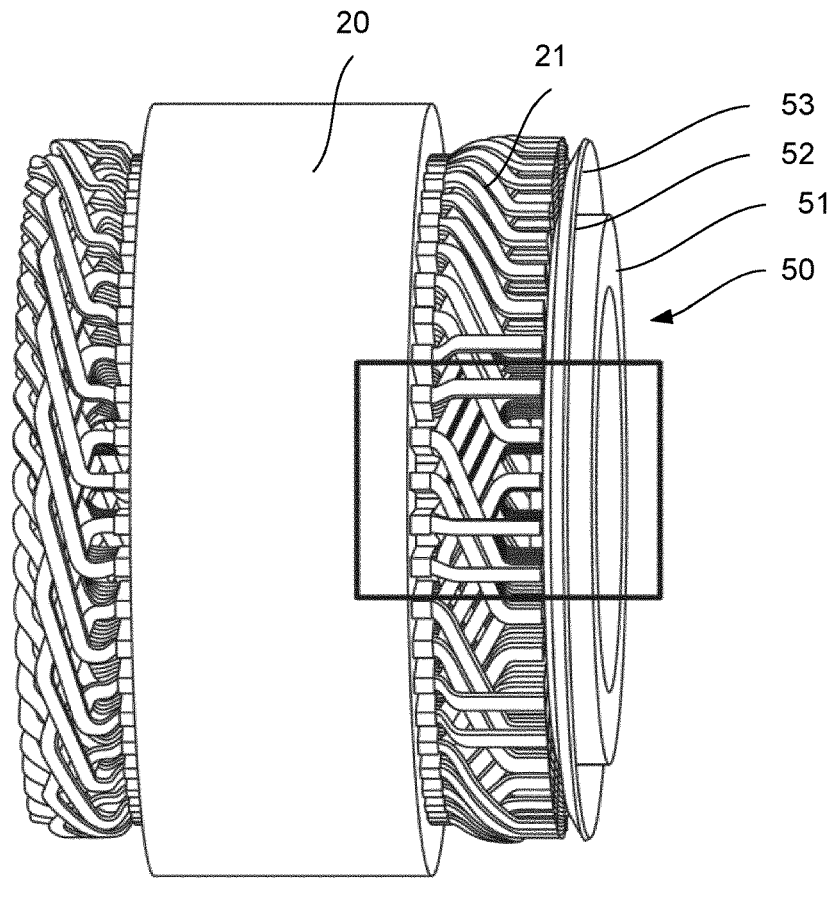
FIG. 3 is an explanatory view of an appearance of the rotor.

FIGS. 2 to 4 are explanatory views of the cooling air control member 50 provided at the first coil end 21 of the present embodiment. FIG. 2 shows a cross-sectional view of a vicinity of the first coil end 21, FIG. 3 shows an appearance of the stator 20, and FIG. 4 shows an enlarged view of a main portion of the first coil end 21.

As shown in FIG. 2, the cooling air control member 50 is interposed between the first coil end 21 and the inner wall of the first housing chamber 41 of the housing 40.

The cooling air control member 50 includes a cylindrical portion 51 having a cylindrical shape and a substantially disk-shaped facing portion 52 connected to the cylindrical portion 51 and extending in a radial direction. An outer edge of the facing portion 52 constitutes a proximity portion 53 formed to be closer to the inner wall of the first housing chamber 41 toward an outer periphery.

An end portion of the cylindrical portion 51 on the stator 20 side in the axial direction abuts on an inner periphery of the first coil end 21. An end portion of the cylindrical portion 51 opposite to the stator 20 abuts on the inner wall of the first housing chamber 41. The facing portion 52 faces an axial end surface of the first coil end 21 and extends radially outward from the cylindrical portion 51 in a disk shape. An outer peripheral end of the proximity portion 53 formed in a peripheral portion of the facing portion 52 abuts on the inner wall of the first housing chamber 41.

In this way, by providing the cooling air control member 50 between the first coil end 21 and the inner wall of the first housing chamber 41 in the axial direction, the cooling air introduced from the introduction port 44 is first separated from the inner wall of the first housing chamber 41 by the proximity portion 53 and directed toward the first coil end 21. Since the cylindrical portion 51 abuts on the first coil end 21, the cooling air passes through the first flow path 211 and the second flow path 212 of the first coil end 21 without passing through the outside of the first coil end 21.

Next, a relationship between the cooling air control member 50 and the first coil end 21 will be described.

As shown in FIG. 4, the first flow path 211 is formed at the base portion of the first coil end 21 near the stator 20. At the axial end portion of the first coil end 21, the open portion 215 that opens in a U-shape is formed by a plurality of joint portions 214, and the open portion 215 forms the second flow path 212. The cylindrical portion 51 of the cooling air control member 50 abuts on an inner peripheral surface of the first coil end 21, thereby blocking a part of the open portion 215 having the U-shape in the axial direction on the inner peripheral surface.

When the cylindrical portion 51 of the cooling air control member 50 blocks a part of the open portion 215, each void of the second flow path 212 has a hole shape as shown by an arrow A in FIG. 4.

A total opening area of flow path cross-sectional areas of the respective hole shapes of the second flow path 212 configured as described above is configured to be substantially the same as a total opening area of flow path cross-sectional areas of respective voids of the first flow path 211 at the base portion of the first coil end 21.

With such a configuration, the cooling air can equally flow through the first flow path 211 at the base portion of the first coil end 21 and the second flow path 212 on the axial end portion side of the first coil end 21, and the cooling air can be caused to flow over the entire first coil end 21.

The total opening area of the second flow path 212 and the total opening area of the first flow path 211 may be changed by changing an axial position of the cylindrical portion 51.

For example, when the total opening area of the second flow path 212 is larger than the total opening area of the first flow path 211, a flow rate of the cooling air on the end portion side of the first coil end 21 can be increased. When the total opening area of the second flow path 212 is smaller than the total opening area of the first flow path 211, the flow rate of the cooling air at the base portion of the first coil end 21 can be increased.

As described above, the embodiment of the present invention is applied to the motor 10 as a rotary electrical machine in which the rotor 30 and the stator 20 are housed in the housing 40 and the coil of the stator 20 is cooled using gas. The stator 20 includes the annular first coil end 21 protruding from the axial end portion of the stator 20, and the housing 40 includes the introduction port 44 that allows gas for cooling the motor 10 to be introduced from the outside of the housing 40 toward the first coil end 21. The first coil end 21 has the flow path (first flow path 211 and second flow path 212) through which the gas introduced from the introduction port 44 passes from the outer peripheral side to the inner peripheral side, and the cooling air control member 50 that guides the gas introduced from the introduction port 44 to the flow path of the first coil end 21 is provided between the first coil end 21 and the housing 40 in the axial direction.

As described above, the cooling air control member 50 is provided between the first coil end 21 and the housing 40, and the gas introduced from the introduction port 44 is guided to the flow path of the first coil end 21. Therefore, the cooling air can be controlled to pass from the outside to the inside of the first coil end 21, and the first coil end 21 can be appropriately cooled.

The cooling air control member 50 includes the cylindrical portion 51 that abuts on the inner peripheral side of the first coil end 21 and protrudes in the axial direction from the first coil end 21, and the facing portion 52 that is erected around the cylindrical portion 51 and faces the axial end surface of the first coil end 21. The facing portion 52 has the proximity portion 53 that approaches the housing 40 toward the outer periphery.

With this configuration, since the proximity portion 53 approaches the first coil end 21 in the circumferential direction of the first coil end 21, the cooling air can be directed toward the first coil end 21.

In addition, the coil is formed of a flat wire. The base portion of the first coil end 21 in the axial direction is provided with the first flow path 221 that is formed of voids formed between a plurality of the flat wires extending in the axial direction and that radially penetrates the first coil end 21 from the outer peripheral side to the inner peripheral side. The end portion side with respect to the base portion is provided with the second flow path 212 that is formed of open portions formed between the plurality of flat wires extending in the axial direction and that radially penetrates the coil end 21 from the outer peripheral side to the inner peripheral side.

With such a configuration, the cooling air control member 50 can cause the cooling air to flow through the flow path between the base portion and the end portion side of the first coil end 21, and thus the entire first coil end 21 can be cooled.

When the cylindrical portion 51 abuts on the inner peripheral surface of the first coil end 21, the open portions 215 each are partially blocked, and the flow path cross-sectional area of the second flow path 212 is restricted, and thus the flow rate of the cooling air flowing through the second flow path 212 of the first coil end 21 can be controlled.

The total opening area of the flow path cross-sectional area of the first flow path 211 is configured to be substantially equal to the total opening area of the flow path cross-sectional area of the second flow path 212 which is restricted by the cylindrical portion 51.

With such a configuration, the cooling air having the same air volume can be circulated through the base portion and the distal end portion of the first coil end 21.

Since the outer peripheral end of the proximity portion 53 abuts on the inner wall of the housing 40, the cooling air can pass through the first flow path 211 and the second flow path 212 without passing through the outside of the first coil end 21.

In addition, the rotor 30 has the vent hole 33 through which the gas passes from one end portion to the other end portion in the axial direction, and the fan 36 that introduces the gas from the introduction port 44 and sends the gas from the one end portion to the other end portion is provided at the one end portion of the rotor 30.

With such a configuration, the first coil end 21 and the second coil end 22 can be cooled by blowing the cooling air from the first housing chamber 41 to the second housing chamber 42 by the fan 36.

Next, modifications of the embodiment of the present invention will be described.

Figure 5:
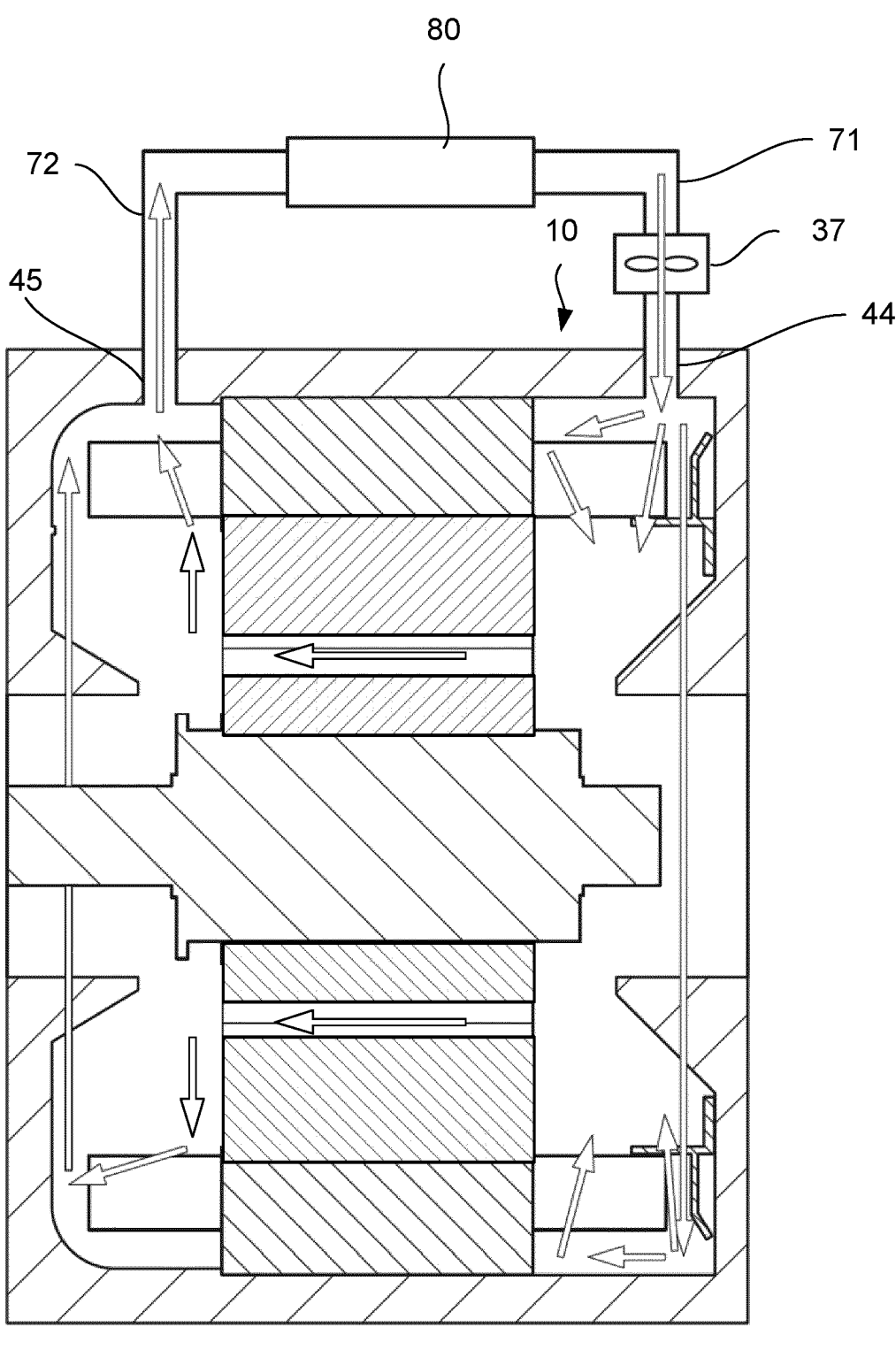
FIG. 5 is an explanatory view of a cooling structure.

FIG. 5 is an explanatory view of the motor 10 according to a modification of the present embodiment.

In the modification shown in FIG. 5, cooling air introduced into the motor 10 is cooled by a heat exchanger, and a fan is provided outside the motor 10 instead of an end portion of the rotor 30. Since the configuration of the motor 10 is the same as the configuration described above with reference to FIG. 1, the description thereof will be omitted.

A first pipe 71 is connected to the introduction port 44 of the first housing chamber 41, and a second pipe 72 is connected to the discharge port 45 of the second housing chamber 42. A heat exchanger 80 is provided between the first pipe 71 and the second pipe 72.

A fan 37 that sends cooling air from the heat exchanger 80 to the introduction port 44 of the motor 10 is provided in the middle of the first pipe 71.

With such a configuration, the cooling air is sent to the first housing chamber 41 of the motor 10 by the rotation of the fan 37. In the first housing chamber, as described above, the cooling air cools the first coil end 21, then passes through the vent hole 33 of the rotor 30, is sent to the second housing chamber 42, and cools the second coil end 22.

The cooling air in the second housing chamber 42 is discharged to the outside of the housing 40 through the discharge port 45, and is sent to the heat exchanger 80 through the second pipe 72. The heat exchanger 80 lowers the temperature of the gas of the cooling air by performing heat exchange.

The cooling air whose temperature is lowered by the heat exchanger 80 is again introduced into the first housing chamber 41 of the housing 40 of the motor 10 through the introduction port 44 by the fan 37.

With such a configuration, the temperature of the cooling air introduced into the motor 10 can be controlled by providing the heat exchanger 80 for cooling the gas to lower the temperature of the cooling air.

Further, since the fan 37 for blowing the cooling air is provided outside the motor 10, the number of components of the motor 10 can be reduced, and the motor 10 is not increased in size.

Figure 6:
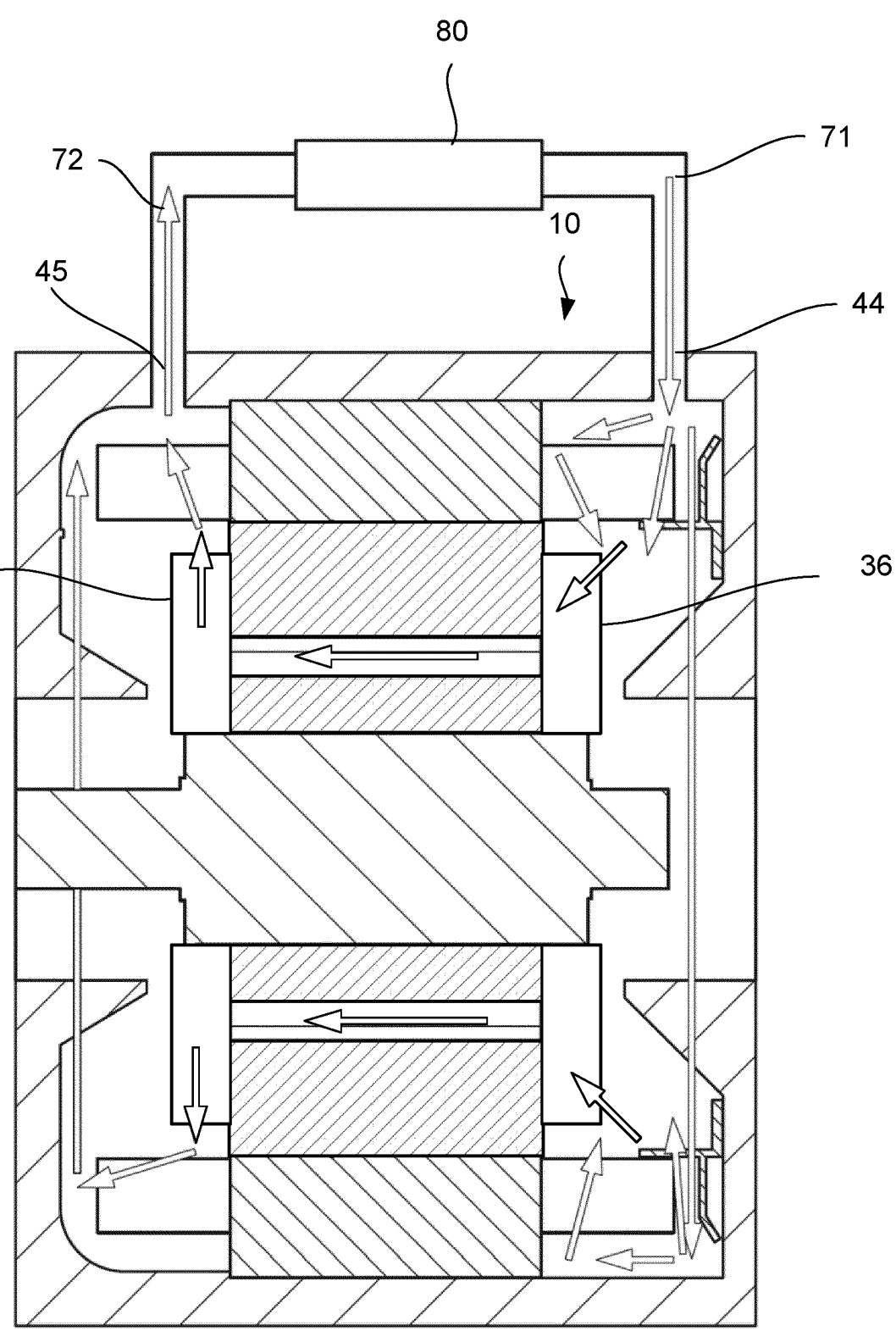
FIG. 6 is an explanatory view of a cooling structure according to a modification.

FIG. 6 is an explanatory view of the motor 10 according to another modification of the present embodiment.

The modification shown in FIG. 6 is similar to the modification shown in FIG. 5, but is different in that fans are provided at both one end portion and the other end portion of the rotor. Since the other configuration is the same as the configuration described above with reference to FIG. 5, the description thereof is omitted.

The first pipe 71 is connected to the introduction port 44 of the first housing chamber 41, and the second pipe 72 is connected to the discharge port 45 of the second housing chamber 42. The heat exchanger 80 is provided between the first pipe 71 and the second pipe 72.

The fan 36 (first fan) described in FIG. 1 is provided at one end portion of the rotor 30. A fan 35 (second fan) is provided at the other end portion of the rotor 30. The fan 35 includes a plurality of blades, and rotates with the rotation of the rotor 30 to take in cooling air from the vent hole 33 of the rotor 30 and generate a flow of the cooling air from the other end portion of the rotor 30 toward the second coil end 22 of the second housing chamber 42.

With such a configuration, the fan 36 is rotated by the rotation of the rotor 30, thereby introducing the cooling air into the first housing chamber 41 of the motor 10 through the introduction port 44. In the first housing chamber, as described above, the cooling air cools the first coil end 21, then passes through the vent hole 33 of the rotor 30.

In the second housing chamber 42, the fan 35 is rotated by the rotation of the rotor 30, and thus the cooling air is taken in from the vent hole 33 and sent to the second coil end 22, thereby cooling the second coil end 22.

The cooling air in the second housing chamber 42 is discharged to the outside of the housing 40 through the discharge port 45, and is sent to the heat exchanger 80 through the second pipe 72. The heat exchanger 80 lowers the temperature of the gas of the cooling air by performing heat exchange.

The cooling air whose temperature is lowered by the heat exchanger 80 is again introduced into the first housing chamber 41 of the housing 40 of the motor 10 through the introduction port 44.

With such a configuration, since the fans that blow the cooling air are provided at both the one end portion and the other end portion of the rotor 30, the flow rate of the cooling air can be increased, and the cooling efficiency of the motor 10 can be improved.

In FIG. 6, the fans are provided at both the one end portion and the other end portion of the rotor 30, but the present invention is not limited to the configuration. The rotor 30 may include only the fan 35 at the other end portion (left side in FIG. 7). The flow rate of the cooling air in this case is substantially the same as that in the configuration in which the fan 35 is provided at the one end portion of the rotor 30 described in FIG. 1.

Although the embodiment and the modifications of the invention have been described above, the above embodiment and modifications are merely a part of application examples of the invention, and do not mean that the technical scope of the invention is limited to the specific configurations of the above embodiment.

The motor 10 according to the present embodiment is mounted on, for example, an electric vehicle and functions as an electric motor that drives wheels. In addition, the motor 10 functions as a generator that performs power generation (regeneration) by receiving a driving force generated by the rotation of the wheels. The motor 10 may be used as a drive device for a device other than a vehicle, for example, various electric devices or industrial machines.

The invention claimed is:

1. A rotary electrical machine comprising:
a rotor; and
a stator; and
a housing that houses the rotor and the stator; wherein:
a coil of the stator is configured to be cooled using gas,
the coil is formed of a flat wire,
the stator comprises an annular coil end protruding from an end portion of the stator in an axial direction thereof,
the housing comprises an introduction port configured to allow gas for cooling the rotary electrical machine to be introduced from an outside of the housing toward the coil end,
in the coil end, a flow path is formed by a gap between the coil end and the coil of the stator, and the gas introduced from the introduction port passes through the flow path from an outer peripheral side to an inner peripheral side,
a cooling air control member configured to guide the gas introduced from the introduction port to the flow path of the coil end is provided between the coil end and the housing in the axial direction, and
the flow path comprises:
a first flow path that is formed of voids formed between a plurality of the flat wires extending in the axial direction and that radially penetrates the coil end from the outer peripheral side to the inner peripheral side, at a base portion of the coil end in the axial direction, and
a second flow path that is formed of open portions formed between the plurality of flat wires extending in the axial direction and that radially penetrates the coil end from the outer peripheral side to the inner peripheral side, at an end portion side with respect to the base portion.

2. The rotary electrical machine according to claim 1, wherein:
the cooling air control member comprises:
a cylindrical portion abutting on an inner peripheral side of the coil end and protruding in the axial direction from the coil end, and
a facing portion erected around the cylindrical portion and facing an axial end surface of the coil end, and
the facing portion comprises a proximity portion that approaches the housing toward an outer periphery.

3. The rotary electrical machine according to claim 2, wherein:
the cylindrical portion abuts on an inner peripheral surface of the coil end, the open portions each are partially blocked, and thus a flow path cross-sectional area of the second flow path is restricted.

4. The rotary electrical machine according to claim 3, wherein:
a total opening area of a flow path cross-sectional area of the first flow path is substantially equal to a total opening area of the flow path cross-sectional area of the second flow path which is restricted by the cylindrical portion.

5. The rotary electrical machine according to claim 2, wherein:
an outer peripheral end of the proximity portion abuts on an inner wall of the housing.

6. The rotary electrical machine according to claim 1, wherein:
the rotor has a vent hole configured to allow gas to pass from one end portion toward the other end portion in the axial direction, and the one end portion of the rotor is provided with a fan configured to introduce gas from the introduction port and send the gas from the one end portion to the other end portion.

* * * * *